Aug. 9, 1966    U. A. BRETING ETAL    3,264,902
TRANSMISSION
Filed Jan. 9, 1964
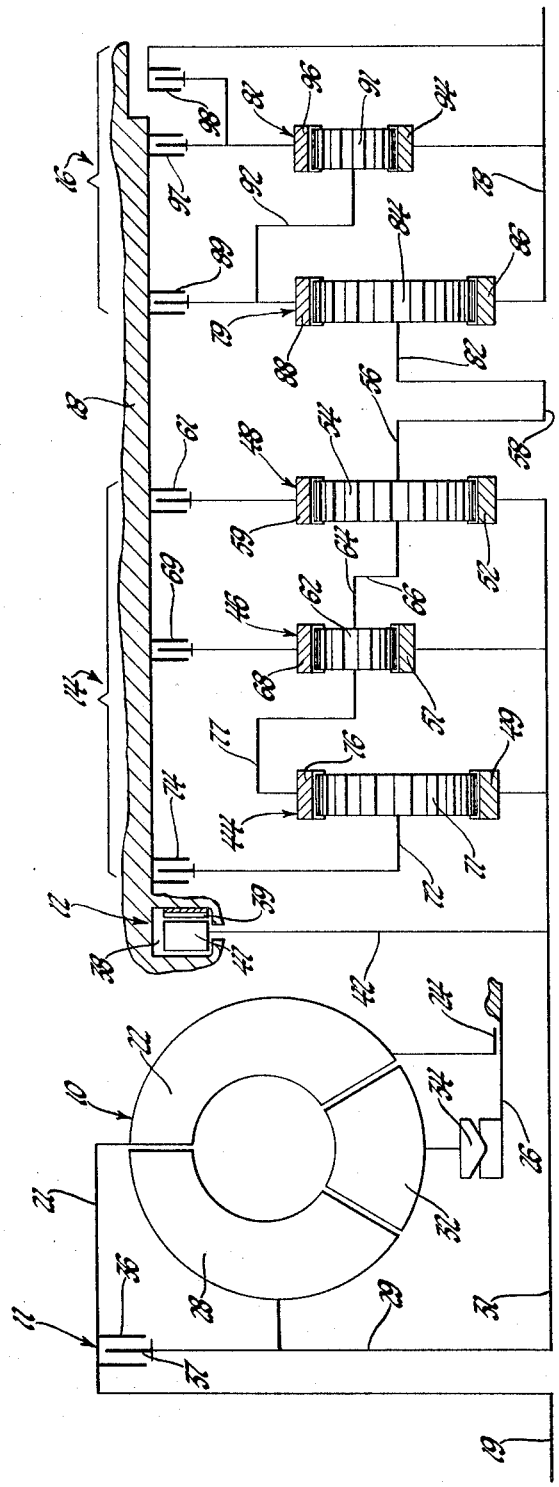
INVENTOR.
Ulysses A. Breting, &
BY Marion D. Smith
a. M. Neiter
ATTORNEY United States Patent Office 3,264,902
Patented August 9, 1966

3,264,902
TRANSMISSION
Ulysses A. Breting and Marion D. Smith, Indianapolis, Ind., assignors to General Motors Corporation, Detroit, Mich., a corporation of Delaware
Filed Jan. 9, 1964, Ser. No. 336,692
9 Claims. (Cl. 74—764)

This invention relates to variable speed transmissions and particularly to variable speed transmissions employing hydrodynamic torque converter and planetary gear drive arrangements.

Large hauling vehicles, ordnance vehicles, off-the-road vehicles such as earth moving vehicles and the like require prime movers having high torque output levels to drive these vehicles. When a transmission employing a hydrodynamic torque converter is utilized to transmit the drive from the prime mover to drive the vehicle certain advantages are gained since the torque converter can provide infinitely variable speed and torque variations within limited ranges to extend the range of usefulness of the prime mover. Furthermore, when planetary gear drive arrangements capable of transmitting and multiplying high input torque levels are combined with the torque converter, the range of usefulness of the prime mover can be further extended and better advantage can be taken of both the prime mover and torque converter to provide a highly efficient transmission of power over a broad torque range and to match a given prime mover to a particular load. Constant efforts are being made to design improved variable speed transmissions, such as transmissions having range gearing employing planetary gear drive arrangements to permit high starting effort in the lowest drive ratio in either forward or reverse and even and small drive ratio steps through the remaining range gearing for accelerating the load without large changes in prime mover speed between each drive ratio to reduce shift shock. Furthermore, it is oftentimes desirable that in both forward and reverse drive, an overdrive ratio be available to permit transmission output speeds greater than prime mover speed to enhance the economy of prime mover operation.

This invention employs in a transmission a torque converter having a driving pump, a turbine driven by the pump and a stator providing torque multiplication with converter or turbine output to a converter output or first intermediate shaft. A converter lock-up clutch is provided which is effective to lock-up the torque converter to provide a direct mechanical drive between the converter output shaft and the input to the torque converter. A hydrodynamic brake which is selectively operable to retard the converter output shaft is provided and the converter output shaft is connected to drive a front or two speed and reverse planetary gear unit which drives a second intermediate shaft which is connected by a rear or three speed planetary gear unit to an output shaft. In the front gear unit, the converter output shaft which provides the input to this gear unit drives the reverse, high and low sun gears of a reverse planetary gear set, a high forward planetary gear set and a low forward planetary gear set respectively. A low forward drive ratio is provided in the front gear unit when a low forward brake is engaged to hold the low ring gear of the low planetary gear set so that the low sun gear input drives the low pinion carrying planet carrier connected to the second intermediate shaft which is thus caused to rotate at a reduced speed. A high forward drive ratio in the front gear unit is provided when a high forward brake is engaged to hold the ring ring of the high planetary gear set so that the high sun gear input drives the high pinion carrying planet carrier connected via the low planet carrier to the second intermediate shaft which is thus caused to rotate at a higher but reduced speed. When a reverse brake is engaged to hold the reverse pinion carrying planet carrier of the reverse planetary gear set, the reverse input sun gear drives through the reverse pinions, the reverse ring connected via the high and low planet carriers to the second intermediate shaft which is thus caused to rotate at a reduced speed and in a direction opposite that of the converter output shaft to provide a reverse drive ratio.

In the rear gear unit, the second intermediate shaft provides an input driving the pinion carrying planet carrier of a high overdrive planetary gear set so that the planet carrier and pinion input drives the high overdrive sun gear of this gear set connected to the output shaft which is thus caused to rotate at an increased speed when the high overdrive ring gear of this gear set is held by a high overdrive brake to provide a high overdrive ratio. A lower overdrive ratio is provided in the rear gear unit by the combination of the high overdrive planetary gear set and a low overdrive planetary gear set. The second intermediate shaft drives the planet carrier of the high overdrive planetary gear set and the high overdrive sun gear connected to the output shaft provides a reaction member to drive the high overdrive ring gear at a reduced speed. The latter gear is connected to drive the low overdrive pinion carrying planet carrier of the low overdrive planetary gear set and when a low overdrive brake is engaged to hold the low overdrive ring gear, the output shaft which has a connection to the low overdrive sun gear is driven at a lesser but increased speed. The lowest ratio in the rear gear unit is a direct drive ratio and is obtained when a direct drive or lock-up clutch is engaged to prevent relative rotation between the low overdrive ring gear and the low overdrive sun gear.

The front or two speed and reverse planetary gear unit and the rear or three speed planetary gear unit thus combined make available six forward drive ratios and three reverse drive ratios by selectively operating the ratio engaging devices in these gear units. The first forward drive ratio, that is the one considered the lowest, produces the greatest torque multiplication and is provided by the combination of the low forward drive ratio in the front gear unit and the direct drive ratio in the rear gear unit. The next drive ratio which is the second forward drive ratio combines the high forward drive ratio in the front gear unit and the direct drive ratio in the rear gear unit. The third forward drive ratio is provided by the low forward drive ratio in the front gear unit in combination with the low overdrive ratio in the rear gear unit. The fourth forward drive ratio is provided by the combination of the high forward drive ratio in the front gear unit in combination with the low overdrive ratio in the rear gear unit. The fifth forward drive ratio is provided by the combination of the low forward drive ratio in the front gear unit and the high overdrive ratio in the rear gear unit and is a direct drive ratio when the low forward and high overdrive planetary gear sets are identical. In the sixth forward drive ratio which is the highest drive ratio and an overdrive ratio, the high forward drive ratio in the front gear unit is combined with the high overdrive ratio in the rear gear unit to drive the output shaft at a speed higher than the speed of the converter output shaft. The first reverse drive ratio, that is the one considered the lowest reverse drive ratio, is provided by the combination of the reverse drive ratio in the front gear unit in combination with the direct drive ratio in the rear gear unit. The next highest reverse drive ratio is the second reverse drive ratio and is provided by the reverse drive ratio in the front gear unit combined with the low overdrive ratio in the rear gear unit. The third reverse drive ratio which is the highest reverse drive ratio and an overdrive reverse drive ratio is provided by the combination of the reverse drive ratio in the front gear unit in combination with the high overdrive ratio in the rear gear unit to drive the final output shaft in reverse and at a speed higher than the speed of the converter output shaft.

An object of this invention is to provide in a variable speed transmission improved planetary gear drive arrangements.

Another object of this invention is to provide an improved variable speed transmission employing planetary gear drive arrangements providing high starting effort in forward and reverse and relatively even and small ratio steps through the remaining range gearing for accelerating the load without gear changes in input speeds to reduce shift shock.

Another object of this invention is to provide a two speed and reverse planetary gear unit in combination with a three speed planetary gear unit operable to selectively provide six forward drive ratios and three reverse drive ratios having relatively even and small ratio steps between each drive ratio.

Another object of this invention is to provide a two speed and reverse planetary gear unit in combination with a three speed planetary gear unit selectively providing a low drive ratio in forward and reverse and relatively even and small ratio steps to higher drive ratios in forward and reverse with there being provided an overdrive ratio in forward and reverse.

Another object of this invention is to provide in a variable speed transmission employing planetary gear drive arrangements, a two speed and reverse planetary gear unit operable to selectively provide a low forward drive ratio, a high forward drive ratio and a reverse drive ratio in combination with a three speed planetary gear unit operable to selectively provide a direct drive ratio, a low overdrive ratio, and a high overdrive ratio, to provide six forward drive ratios and three reverse drive ratios including an overdrive ratio in forward and reverse.

Another object of this invention is to provide a two speed and reverse planetary gear unit selectively providing a low forward drive ratio, a high forward drive ratio and a reverse drive ratio between an intermediate shaft and an input shaft and a three speed planetary gear unit connecting the intermediate shaft to an output shaft selectively providing a direct drive ratio, a low overdrive ratio and a high overdrive ratio and the gear units combined operable to selectively provide six forward drive ratios including a forward overdrive ratio and three reverse drive ratios including a reverse overdrive ratio.

Another object of this invention is to provide in a transmission a torque converter and lock-up clutch unit connected by a first intermediate shaft to a two speed and reverse planetary gear unit to drive a second intermediate shaft connected by a three speed planetary gear unit to an output shaft with the two speed and reverse planetary gear unit providing two reduction drive ratios and reverse and the three speed planetary gear unit providing two overdrive ratios and a direct drive ratio and the two speed and reverse planetary gear unit in combination with the three speed planetary gear unit selectively providing six forward drive ratios and three reverse drive ratios including a direct and an overdrive ratio in forward and an overdrive ratio in reverse.

Another object of this invention is to provide in a variable speed transmission employing a torque converter and planetary gear drive arrangements, a torque converter driven two speed and reverse planetary gear unit having three planetary gear sets with sun gear inputs selectively providing a low forward drive ratio with planet carrier output in the first gear set, a high forward drive ratio with planet carrier output in the second gear set and a reverse drive ratio with ring gear output in the third gear set in combination with a three speed planetary gear unit having two planetary gear sets with planet carrier inputs and a lock-up clutch selectively providing a direct drive ratio with lock-up of these gear sets, a high overdrive ratio with sun gear output in the first gear set and a low overdrive ratio with reduction planet carrier input in the second gear set by the ring gear of the first gear set and sun gear output to selectively provide a first forward drive ratio by the combination of the low forward drive ratio and the direct drive ratio, a second forward drive ratio by the combination of the high forward drive ratio and the direct drive ratio, a third forward drive ratio by the combination of the low forward drive ratio and the low overdrive ratio, a fourth forward drive ratio by the combination of the high forward drive ratio and the low overdrive ratio, a fifth forward drive ratio by the combination of the low forward drive ratio and the high overdrive ratio, a sixth forward drive ratio by the combination of the high forward drive ratio and the high overdrive ratio, a first reverse drive ratio by the combination of the reverse drive ratio and the direct drive ratio, a second reverse drive ratio by the combination of the reverse drive ratio and the low overdrive ratio and a third reverse drive ratio by the combination of the reverse drive ratio and the high overdrive ratio.

These and other objects of the invention will be more apparent from the following description and drawing of a preferred embodiment of the invention.

The drawing shows diagrammatically a preferred embodiment of the invention.

The transmission drive train shown diagrammatically in the drawing illustrating features of this invention includes a torque converter and lock-up clutch unit having a torque converter 10 and a converter lock-up clutch 11, a hydrodynamic brake unit 12, a front or two speed and reverse planetary gear unit 14 and a rear or three speed gear unit 16 all located in a transmission housing 18. These two gear units 14 and 16 offer, as will become apparent, at least six forward speeds and three reverse speeds.

Power input to the transmission from a prime mover (not shown) is by a power input or engine shaft 19 rotatably mounted in suitable bearings and connected to rotatably drive in a forward direction a torque converter housing 21 which has a rear curved portion to which the torque converter pump blades 22 are attached and a hub 24 which may be supported on a ground sleeve 26 secured to the transmission housing 18. The torque converter pump blades 22 circulate the fluid counterclockwise to turbine blades 28 which are connected by an output hub 29 to rotatably drive in a forward direction a converter output or first intermediate shaft 31 which provides the input to the front gear unit. When the fluid leaves the turbine blades 28 it is redirected to the pump blades 22 by stator blades 32 which are connected by a one-way brake 34 to the ground sleeve 26. The torque converter multiplie torque with the torque gradually decreasing from stall with increasing turbine speed until the turbine obtains a speed close to pump speed. At this point which corresponds to the coupling speed there is no reaction at the stator and the stator is free to rotate in the forward direction since the one-way brake 34 only prevents reverse rotation.

The converter lock-up clutch 11 has drive plates 36 splined to converter housing 21 and a driven plate 37 sandwiched between these drive plates splined to output hub 29. This clutch when actuated is effective to prevent relative rotation between the converter housing 21 and output hub 29 and thus prevents relative rotation between engine shaft 19 and converter output shaft 31 to provide a direct mechanical drive between these shafts which bypasses the torque converter 10.

The hydrodynamic brake unit 12 is located between the torque converter 10 and the front or two speed and reverse planetary gear unit 14 in a brake chamber 38 provided in the transmission housing 18. An annular series of radial vanes 39 which provide the stator element of the hydrodynamic brake are located in brake chamber 38 and fixed to housing 18. The rotor element of the hydrodynamic brake consists of an annular series of radial vanes 41 mounted on a hub 42 secured to the converter output shaft 31. The hydrodynamic brake unit 12 is effective to retard the rotation of the converter output shaft 31 and thus the speed of the vehicle being driven upon the controlled supply of fluid to brake chamber 38. This controlled supply of fluid may be accomplished in any suitable known manner such as by the hydrodynamic brake control system explained in detail in Patent Number 2,864,473, Howard W. Christenson et al. assigned to the assignee of this invention.

The front or two speed and reverse planetary gear unit 14 comprises a reverse planetary gear set 44, a high forward planetary gear set 46 and a low forward planetary gear set 48. The converter output shaft 31 drives the reverse sun gear 49 of the reverse gear set 44, the high sun gear 51 of the high forward gear set 46, and the low sun gear 52 of the low forward gear set 48.

In the low forward gear set 48, the low sun gear 52 meshes with a plurality of planetary pinions 54 journaled on an output planet carrier 56 which is drivingly connected to a second intermediate shaft 58. Pinions 54 mesh with a front gear unit low forward ring gear 59 which may be restrained from rotation by a front gear unit low forward brake 61. When low ring gear 59 is restrained from rotation by the low forward brake 61, the reaction at this gear will cause the output planet carrier 56 and thus the second intermediate shaft 58 to be revolved in the same direction as the low sun gear 52 which is driven by the converter output shaft 31 but at a reduced speed with respect thereto to provide in the front gear unit 14 a low forward drive ratio between the second intermediate shaft 58 and converter output shaft 31.

In the high forward gear set 46, the high sun gear 51 meshes with a plurality of planetary pinions 62 journaled on an output planet carrier 64 which is drivingly connected to the second intermediate shaft 58 and for that purpose the output planet carrier 56 of the low forward gear set 48 has a web 66 extending radially outward and having a connection to the output planet carrier 64. The pinions 62 mesh with a controlled high ring gear 68 which may be restrained from rotation by a high forward brake 69. The high forward gear set 46 is proportioned so that when high ring gear 68 is restrained from rotation by the high forward brake 69, the reaction at the high ring gear 68 will cause the planet carrier 64 and thus the planet carrier 56 and second intermediate shaft 58 to be revolved in the same direction as the high sun gear 51 which is driven by the converter output shaft 31 but at a reduced speed with respect thereto to provide a higher forward drive ratio than that provided by the low forward gear set 48.

In the reverse gear set 44, the reverse sun gear 49 meshes with a plurality of planetary pinions 71 journaled on a controlled planet carrier 72 which may be restrained from rotation by a reverse brake 74. An output or reverse ring gear 76 meshes with the pinions 71 and when the planet carrier 72 is restrained from rotation by the reverse brake 74, this ring gear revolves in a direction opposite the direction of rotations of the converter output shaft 31 and at a reduced speed to provide the output of this gear set and the reverse drive ratio in the front gear unit 14. The reverse ring gear 76 is drivingly connected to the second intermediate shaft 58 and for that purpose the output planet carrier 64 of the high forward gear set 46 has a drive connection 77 to the reverse ring gear 76 and with this connection in addition to the connection between the output planet carrier 64 and the output planet carrier 56 of the low forward gear set 48, there is provided a unitary assembly consisting of reverse ring gear 76, output planet carrier 64 of the high forward gear set 46 and output planet carrier 56 of the low forward gear set 48 drivingly connected to the second intermediate shaft 58.

The second intermediate shaft 58 which is driven by the front or two speed and reverse gear unit 14 is connected by the rear or three speed gear unit 16 to drive a load or output shaft 78 which is drive connected in any suitable way to the vehicle wheels (not shown). The rear gear unit 16 comprises a high overdrive planetary gear set 79 and a low overdrive planetary gear set 81 and the second intermediate shaft 58 provides the input to this gear unit and is connected to drive the input planet carrier 82 of the high overdrive gear set 79. Pinions 84 journaled on the input planet carrier 82 mesh with an output or high overdrive sun gear 86 connected to the output shaft 78 and a controlled and output high overdrive ring gear 88 which may be restrained from rotation by a high overdrive brake 89. When ring gear 88 is restrained from rotation by the high overdrive brake 89, the reaction at this gear will cause the sun gear 86 and thus the output shaft 78 to be revolved in the same direction as the second intermediate shaft 58 but at a higher speed with respect thereto to provide a high overdrive ratio between the output shaft 78 and second intermediate shaft 58 in the rear gear unit 16.

In the low overdrive gear set 81, planetary pinions 91 journaled on a planet carrier 92 which has a connection to the high overdrive ring gear 88 mesh with an output or low overdrive sun gear 94 connected to the output shaft 78 and with a controlled low overdrive ring gear 96 which may be restrained from rotation by a low overdrive brake 97. The low overdrive gear set 81 is proportioned so that when low overdrive ring gear 96 is restrained from rotation by the low overdrive brake 97, the second intermediate shaft 58 drives the input carrier 82 of the high overdrive planetary gear set 79, and the high overdrive sun gear 86 connected to the output shaft 78 provides a reaction member to drive the high overdrive ring gear 88 in the same direction but at a reduced speed relative to the second intermediate shaft 58. With ring gear 96 being restrained from rotation, the reaction at this gear causes the sun gear 94 to revolve in the same direction but at a higher speed relative to the second intermediate shaft 58 to provide an intermediate or low overdrive ratio between output shaft 78 and the second intermediate shaft 58 lower than that provided by the high overdrive gear set 79.

Direct drive in the rear gear unit 16 is provided by a direct drive clutch 98 operative to prevent relative rotation between the low overdrive ring gear 96 and the output shaft 78 and thus the low overdrive sun gear 94 to lock-up the low overdrive gear set 81 and thus the high overdrive gear set 79 so that the rear gear unit 16 operates in direct drive and the output shaft 78 is driven at the same speed as the second intermediate shaft 58 to provide a direct drive ratio.

The various brakes and clutches employed in the transmission diagrammatically shown in the drawing may be actuated in any known way, e.g. electrically, hydraulically, pneumatically or by some mechanical provision and in a certain sequence. The sequence of operation will be described in the following operational summary.

The low forward drive ratio, high forward drive ratio and reverse drive ratio provided by the front gear unit 14 when used in combination with each of the three ratios provided in the rear gear unit 16 enables at least six different forward drive ratios and three reverse drive ratios to be obtained. The first forward drive ratio, that is the one considered the lowest forward drive ratio, produces the greatest torque multiplication and occurs when the front gear unit 14 is conditioned for its lowest forward drive ratio which is the low forward drive ratio and the rear gear unit is conditioned for its lowest ratio which is the direct drive ratio. This demands that the front gear unit low forward brake 61 and the rear gear unit direct drive clutch 98 both be engaged to respectively prevent the front gear unit low forward ring gear 59 from reverse rotation and prevent relative rotation between the low overdrive ring gear 96 and the low overdrive sun gear 94 to lock-up the low overdrive gear set 81 and high overdrive gear set 79 and thus the rear gear unit 16 for direct drive. Then with the converter output shaft 31 being driven forwardly, the output planet carrier 56 in the low forward gear set 48 and thus the second intermediate shaft 58 and output shaft 78 will be driven at a reduced speed relative to the converter output shaft 31.

To establish the second forward drive ratio, the rear gear unit 16 remains in its direct drive status with the direct drive clutch 98 engaged and the front gear unit 14 is altered by disengaging the low forward brake 61 and engaging the high forward brake 69. Then with the converter output shaft 31 being driven forwardly, the planet carrier 64 and thus the planet carrier 56, the second intermediate shaft 58 and the output shaft 78 will be driven at a reduced speed relative to the converter output shaft 31 but at a higher speed than that obtained in the first forward drive ratio.

The next ratio change which is to the third forward drive ratio is a so-called double transition shift in that the front and rear gear units 14 and 16 are completely reconditioned. In the front gear unit 14, the high forward brake 69 is disengaged and the low forward brake 61 reengaged so as to again afford the low forward ratio in the front gear unit 14. The rear gear unit 16 is altered for the low overdrive ratio by the disengagement of the direct drive clutch 98 and the engagement of the low overdrive brake 97. Then with the converter output shaft 31 being driven forwardly, the output planet carrier 56 and thus the second intermediate shaft 58 will be driven at a reduced speed relative to the converter output shaft 31 which is determined by the low forward drive ratio of the low forward gear set 48. The second intermediate shaft 58 when being driven at this reduced speed drives the input planet carrier 82 of the high overdrive gear set 79 in the rear gear unit 16 and the high overdrive sun gear 86 fixed to the output shaft 78 provides the reaction member to drive the ring gear 88 at a reduced speed relative to the second intermediate shaft 58 which is determined by the high overdrive gear set 79. The high overdrive ring gear 88 in turn drives the planet carrier 92 of the low overdrive gear set 81 at this reduced speed and with the low overdrive brake 97 engaged, the reaction at the low overdrive ring gear 96 causes the output or low overdrive sun gear 94 and thus the output shaft 78 to revolve in the same direction but at an increased speed relative to the second intermediate shaft 58 and at a reduced speed relative to converter output shaft 31 to provide the third forward drive ratio which is higher than the second forward drive ratio.

In the fourth forward drive ratio, the rear gear unit 16 retains its low overdrive ratio status with the low ovedrive brake 97 applied and the front gear unit 14 is altered by disengaging the low forward brake 61 and re-engaging the high forward brake 69. The reaction at the high ring gear 68 causes the planet carrier 64 and thus the planet carrier 56 and second intermediate shaft 58 to revolve forwardly to again afford the high forward drive ratio in the front gear unit 14. In comparison with the third forward drive ratio the input planet carrier 82 of the rear gear unit 16 is caused to rotate at higher speeds but however, the output shaft 78 still rotates at a reduced speed relative to converter output shaft 31 since the reduction provided by the high forward drive ratio in the front gear unit 14 offsets the overdrive provided by the low overdrive ratio in the rear gear unit 16 and the front gear unit 14 and rear gear unit thus combined provide the fourth forward drive ratio which is higher than the third forward drive ratio.

In the fifth forward drive ratio, there is again a double transition shift in that the front and rear gear units 14 and 16 are again completely reconditioned. In the front gear unit 14, the high forward brake 69 is disengaged and the low forward brake 61 is reengaged for the low forward drive ratio. The rear gear unit 16 is altered for the high overdrive ratio by engagement of the high overdrive brake 89. Then with the converter output shaft 31 being driven forwardly, the reaction at the low ring gear 59 causes the output planet carrier 56 and thus the second intermediate shaft 58 to be revolved at the reduced speed provided by the low forward ratio of the front gear unit 14. The input carrier 82 in the rear gear unit 16 is thus revolved at this same reduced speed and with reaction at the high overdrive ring gear 88 the output shaft 78 is driven at an increased speed relative to the second intermediate shaft 58. With the low forward gear set 48 and high ovedrive gear set 79 being identical the reduciton provided by gear set 48 is exactly offset by the overdrive provided by gear set 79 and the front gear unit 14 and rear gear unit 16 thus combined provide the fifth forward drive ratio between output shaft 78 and converter output shaft 31 which is a direct or 1:1 drive ratio and higher than the fourth forward drive ratio.

To establish the sixth forward drive ratio which is the highest forward drive ratio, the low forward brake 61 in the front gear unit 14 is disengaged and the high forward brake 69 is reengaged and the rear gear unit 16 retains its high overdrive ratio status with the high overdrive brake 89 applied. Then with the converter output shaft 31 rotating forwardly, the planet carrier 64 of the high forward gear set 46 and thus the planet carrier 56 and second intermediate shaft 58 are driven in the high forward ratio of the front gear set 14 to drive the input carrier 82 of the high overdrive gear set 79 in the rear gear unit 16 which is conditioned for the high overdrive ratio. The high overdrive ratio in the rear gear unit 16 offsets the speed reduction provided by the high forward drive ratio in the front gear unit 14 so that the output shaft 78 is driven at higher speeds than converter output sharft 31, and the front gear unit 14 and rear gear unit 16 thus combined provide the sixth forward drive ratio which is in an overdrive ratio and higher than the fifth forward drive ratio.

To establish the first reverse drive ratio, that is the one considered the lowest reverse drive ratio, the reverse brake 74 in the front gear unit 14 is engaged and the reverse planet carrier 72 provides a reaction when the converter output shaft 31 is driven in the forward direction to cause reverse ring gear 76 and thus planet carrier 64, planet carrier 56 and second intermediate shaft 58 to be driven in the reverse direction and at a reduced speed relative to the converter output shaft 31. In the rear gear unit 16, the direct drive clutch 98 is engaged to lock up this gear unit and thus the output shaft 78 revolves in the same direction as the second intermediate shaft 58 and at the same speed and in a direction opposite that of the converter output shaft 31.

In the second reverse drive ratio which is a higher ratio than the first reverse drive ratio, the reverse brake 74 in the front gear unit 14 remains engaged and in the rear gear unit 16 the direct drive clutch 98 is disengaged and the low overdrive brake 97 is engaged. The second intermediate shaft 58 rotates in the reverse direction and at the same speed as in the first reverse drive ratio and drives the input carrier 82 in the rear gear unit in the reverse direction. The high overdrive sun gear 86 provides the reaction member to drive the high overdrive ring gear 88 at a reduced speed and the ring gear 88 in turn drives the planet carrier 92 of the low overdrive gear set 81. With the low overdrive brake 97 engaged, there is reaction at the low overdrive ring gear 96 to cause the low overdrive sun gear 94 and thus the output shaft 78 to revolve in the same direction as the second intermediate shaft 58 but at a higher speed as determined by the low overdrive ratio to provide the higher reverse drive ratio.

In the third reverse drive ratio which is the highest reverse drive ratio and an overdrive ratio, the reverse brake 74 in the front gear unit 14 remains engaged and in the rear gear unit 16, the low overdrive brake 97 is disengaged and the high overdrive brake 89 is engaged to provide the high overdrive ratio in the rear gear unit 16. The second intermediate shaft 58 again revolves in the reverse direction like in the first and second reverse drive ratios to drive the input planet carrier 82 in the rear gear unit 16. Reaction at the high overdrive ring gear 88 then causes the high overdrive sun gear 86 and thus output shaft 78 to be revolved at a higher speed and in the same direction as the second intermediate shaft 58. The high overdrive ratio in the rear gear unit 16 offsets the speed reduction provided by the reverse ratio so that the output shaft 78 is driven at higher speeds than converter output shaft 31.

When the sun gears 49, 52 and 86 are identical and each has 25 teeth, the sun gear 51 has 41 teeth, the sun gear 94 has 37 teeth and the ring gears 76, 68, 59, 88 and 96 are identical and each has 75 teeth, the drive ratios between the output shaft 78 and converter output shaft 31 in the first forward drive ratio is 4.00:1, in the second forward drive ratio is 2.83:1, in the third forward drive ratio is 1.99:1, in the fourth forward drive ratio is 1.41:1, in the fifth forward drive ratio is 1.00:1, in the sixth forward drive ratio is 0.71:1, in the first reverse drive ratio is —3.00:1, in the second reverse drive ratio is —1.49:1, and in the third reverse drive ratio is —0.75:1. The drive ratio step pattern is determined by dividing each succeeding higher drive ratio into the immediately preceding lower drive ratio and with the drive ratios provided above, the step between the first and second forward drive ratios is 1.41, the step between the second and third forward drive ratios is 1.42, the step between the third and fourth forward drive ratios is 1.41, the step between the fourth and fifth forward drive ratios is 1.41, the step between the fifth and sixth forward drive ratios is 1.41, the step between the first and second reverse drive ratios is 2.02 and the step between the second and third reverse drive ratios is 1.99.

The above-described preferred embodiment is illustrative of the invention which it will be appreciated may be modified within the scope of the appended claims.

We claim:

1. In a transmission drive train the combination of
   (a) an input member, an output member, an intermediate member, a bidirectional gear unit including first, second and third reduction planetary gear sets to drivingly connect said input member to said intermediate member and a unidirectional gear unit including first and second overdrive planetary gear sets to drivingly connect said intermediate member to said output member,
   (b) said first reduction planetary gear set having an input element drivingly connected to said input member, a reaction element, an output element drivingly connected to said intermediate member and a brake for said reaction element which when retarded and said input member is rotated causes said intermediate member to rotate in the same direction and at a reduced speed relative to said input member to provide a first forward reduction ratio,
   (c) said second reduction planetary gear set having an input element drivingly connected to said input member, a reaction element, an output element drivingly connected to said intermediate member and a brake for said reaction element which when retarded and said input member is rotated causes said intermediate member to rotate in the same direction and at a reduced speed relative to said input member less than the relative speed difference provided by said first reduction planetary gear set to provide a second forward reduction ratio lower than said first forward reduction ratio,
   (d) said third reduction planetary gear set having an input element drivingly connected to said input member, a reaction element, an output element drivingly connected to said intermediate member and a brake for said reaction element which when retarded and said input member is rotated causes said intermediate member to rotate in the opposite direction and at a reduced speed relative to said input member to provide a reverse reduction ratio,
   (e) said first overdrive planetary gear set having an input element drivingly connected to said intermediate member a reaction element, an output element drivingly connected to said output member and a brake for said reaction element which when retarded and said intermediate member is rotated causes said output member to rotate in the same direction and at an increased speed relative to said intermediate member to provide a first overdrive ratio,
   (f) said second overdrive planetary gear set having an input element drivingly connected to said reaction element of said first overdrive planetary gear set, a reaction element, an output element drivingly connected to said output member and a brake for said reaction element which when retarded and said input element of said first overdrive planetary gear set is rotated by said intermediate member causes said output element of said first overdrive planetary gear set to provide a reaction to rotate said reaction element of said first overdrive planetary gear set and said input element of said second overdrive planetary gear set in the same direction and at a reduced speed relative to said input element of said first overdrive planetary gear set and causes said output member to rotate in the same direction and at an increased speed relative to said intermediate member less than the relative speed difference provided by said first overdrive planetary gear set to provide a second overdrive ratio lower than said first overdrive ratio,
   (g) a clutch in said unidirectional gear unit operable to selectively prevent relative rotation between said intermediate member and said output member to provide in said unidirectional gear unit a direct drive ratio,
   (h) and said output element of said second reduction planetary gear set being drivingly connected to said intermediate member via said output element of said first reduction planetary gear set and said output element of said third reduction planetary gear set being drivingly connected to said intermediate member via said output element of said second reduction planetary gear set and said output element of said first planetary gear set.

2. The invention defined in claim 1 and said gear units combined selectively providing a first forward drive ratio by the combination of said first forward reduction drive ratio and said direct drive ratio, a second forward drive ratio by the combination of said second forward reduction drive ratio and said direct drive ratio, a third forward drive ratio by the combination of said first forward reduction drive ratio and said second overdrive ratio, a fourth forward drive ratio by the combination of said second reduction drive ratio and said second overdrive ratio, a fifth and direct forward drive ratio by the combination of said first reduction drive ratio and said first overdrive ratio, a sixth forward drive ratio by the combination of said second reduction drive ratio and said first overdrive ratio with said first and second reduction drive ratios and said first and second overdrive ratios being proportioned so that the drive ratio steps between said six forward drive ratios are substantially equal steps.

3. The invention defined in claim 1 and said gear units combined selectively providing a first reverse drive ratio by the combination of said reverse reduction drive ratio and said direct drive ratio, a second reverse drive ratio by the combination of said reverse reduction drive ratio and said second overdrive ratio, a third reverse drive ratio by the combination of said reverse reduction drive ratio and said first overdrive ratio with said reverse reduction drive ratio, said first overdrive ratio and said second overdrive ratio being proportioned so that the drive ratio steps between said three reverse drive ratios are substantially equal steps.

4. In a transmission drive train the combination of
(a) an input member, an output member and an intermediate member,
(b) a bidirectional gear unit to drivingly connect said input member to said intermediate member including first, second and third reduction planetary gear sets,
(c) said first reduction planetary gear set comprising a sun gear drivingly connected to said input member, a ring gear, a carrier having planetary pinions meshing with said sun gear and said ring gear and being drivingly connected to said intermediate member, and a brake operable to retard said ring gear to provide a first forward reduction drive ratio between said intermediate member and said input member,
(d) said second reduction planetary gear set comprising a sun gear drivingly connected to said input member, a ring gear, a carrier having planetary pinions meshing with said sun gear and said ring gear being drivingly connected to said intermediate member, and a brake operable to retard said ring gear to provide a second forward reduction drive ratio between said intermediate member and said input member higher than said one forward reduction drive ratio,
(e) said third reduction planetary gear set comprising a sun gear drivingly connected to said input member, a ring gear drivingly connected to said intermediate member, a carrier having planetary pinions meshing with said sun gear and said ring gear, and a brake operable to retard said carrier to provide reverse reduction drive ratio between said intermediate member and said input member,
(f) a unidirectional gear unit to drivingly connect said intermediate member to said output member including first and second overdrive planetary gear sets,
(g) said first overdrive planetary gear set comprising a sun gear drivingly connected to said output member a ring gear, a carrier having planetary pinions meshing with said sun gear and ring gear and being drivingly connected to said intermediate member, and a brake operable to retard said ring gear to provide a first overdrive ratio between said output member and said intermediate member,
(h) said second overdrive planetary gear set having a sun gear drivingly connected to said output member, a ring gear, a carrier having planetary pinions meshing with said sun gear and said ring gear and being drivingly connected to said ring gear of said first overdrive planetary gear set, and a brake operable to retard said ring gear to provide a second overdrive ratio between said output member and said intermediate member lower than said first overdrive ratio,
(i) and a clutch in said unidirectional gear unit operable to prevent relative rotation between said sun gear and said ring gear of said second overdrive planetary gear set whereby said first and second overdrive planetary gear sets are locked-up to provide in said unidirectional gear unit a direct drive ratio between said output member and said intermediate member.

5. The invention defined in claim 4 and said carrier of said second reduction planetary gear set being drivingly connected to said intermediate member via said carrier of said first reduction planetary gear set and said ring gear of said third reduction planetary gear set being connected to said intermediate member via said carriers of said first and second reduction planetary gear sets.

6. The invention defined in claim 4 and said gear units combined selectively providing a first forward drive ratio by the combination of said first forward reduction drive ratio and said direct drive ratio, a second forward drive ratio by the combination of said second forward reduction drive ratio and said direct drive ratio, a third forward drive ratio by the combination of said first forward reduction drive ratio and said second overdrive ratio, a fourth forward drive ratio by the combination of said second reduction drive ratio and said second overdrive ratio, a fifth and direct forward drive ratio by the combination of said first reduction drive ratio and said first overdrive ratio, a sixth forward drive ratio by the combination of said second reduction drive ratio and said first overdrive ratio with said first and second reduction drive ratios and said first and second overdrive ratios being proportioned so that the drive ratio steps between said six forward drive ratios are substantially equal steps.

7. The invention defined in claim 6 and said gear units combined selectively providing a first reverse drive ratio by the combination of said reverse reduction drive ratio and said direct drive ratio, a second reverse drive ratio by the combination of said reverse reduction drive ratio and said second overdrive ratio, a third reverse drive ratio by the combination of said reverse reduction drive ratio and said first overdrive ratio with said reverse reduction drive ratio, said first overdrive ratio and said second overdrive ratio being proportioned so that the drive ratio steps between said three reverse drive ratios are substantially equal steps.

8. In a transmission drive train the combination of
(a) a hydrodynamic torque converter unit operable to rotatably drive a first intermediate member,
(b) a second intermediate member and an output member,
(c) a two forward speed-one reverse speed gear unit to drivingly connect said first intermediate member to said second intermediate member including first, second and third reduction planetary gear sets,
(d) clutch means operable to lock-up said hydrodynamic torque converter unit to selectively provide a direct mechanical drive therethrough and hydrodynamic brake means operable to selectively retard said first intermediate member,
(e) said first reduction planetary gear set comprising a sun gear drivingly connected to said first intermediate member, a ring gear, a carrier having planetary pinions meshing with said sun gear and said ring gear and being drivingly connected to said second intermediate member, and a brake operable to retard said ring gear to provide one forward reduction drive ratio between said second intermediate member and said first intermediate member,
(f) said second reduction planetary gear set comprising a sun gear drivingly connected to said first intermediate member, a ring gear, a carrier having planetary pinions meshing with said sun gear and said ring gear and being drivingly connected via said carrier of said first reduction planetary gear set to said second intermediate member, and a brake operable to retard said ring gear to provide a second forward reduction drive ratio between said second intermediate member and said first intermediate member higher than said one forward reduction drive ratio,
(g) said third rerduction planetary gear set comprising a sun gear drivingly connected to said first intermediate member, a ring gear drivingly connected via said carriers of said first and second reduction planetary gear sets to said second intermediate member, a carrier having planetary pinions meshing with said sun gear and said ring gear, and a brake operable to retard said carrier to provide a reverse reduction drive ratio between said second intermediate member and said first intermediate member, (h) a three speed unidirectional gear unit to drivingly connect said intermediate member to said output member including first and second overdrive planetary gear sets, (i) said first overdrive planetary gear set comprising a sun gear drivingly connected to said output member, a ring gear, a carrier having planetary pinions meshing with said sun gear and ring gear and being drivingly connected to said second intermediate member, and a brake operable to retard said ring gear to provide a first overdrive ratio between said output member and said second intermediate member, (j) said second overdrive planetary gear set having a sun gear drivingly connected to said output member, a ring gear, a carrier having planetary pinions meshing with said sun gear and said ring gear and being drivingly connected to said ring gear of said first overdrive planetary gear set, and a brake operable to retard said ring gear to provide a second overdrive ratio between said output member and said second intermediate member lower than said first overdrive ratio.

9. The invention defined in claim 8 and clutch means in said unidirectional gear unit operable to prevent relative rotation between said sun gear and said ring gear of said second overdrive planetary gear set to lock-up said first and second overdrive planetary gear sets to provide in said unidirectional gear unit a direct drive ratio between said output member and said second intermediate member.

References Cited by the Examiner

UNITED STATES PATENTS

| | | | |
|---|---|---|---|
| 2,433,052 | 12/1947 | Kelley | 74—765 |
| 2,503,497 | 4/1950 | Le May | 74—759 |
| 2,886,893 | 5/1959 | Miller | 74—759 |
| 2,890,603 | 6/1959 | Harris et al. | 74—740 |
| 2,990,727 | 7/1961 | Miller | 74—759 |
| 3,096,666 | 7/1963 | Christenson et al. | 74—765 |
| 3,147,643 | 9/1964 | Christenson et al. | 74—764 |

FOREIGN PATENTS

| | | |
|---|---|---|
| 743,814 | 1/1956 | Great Britain. |
| 798,424 | 7/1958 | Great Britain. |
| 929,333 | 6/1963 | Great Britain. |

FRANK SUSKO, *Primary Examiner.*

THOMAS C. PERRY, DAVID J. WILLIAMOWSKY,
*Examiners.*